US012188498B2

(12) United States Patent
Quan et al.

(10) Patent No.: US 12,188,498 B2
(45) Date of Patent: Jan. 7, 2025

(54) BAFFLE PLATE DEVICES FOR SENSOR FLOW IMPROVEMENT IN EXHAUST GAS AFTERTREATMENT SYSTEMS

(71) Applicant: DAIMLER TRUCK NORTH AMERICA, LLC, Portland, OR (US)

(72) Inventors: Peng Quan, Portland, OR (US); Jeffrey Asaro, Portland, OR (US); Kevin Sisken, Southport, NC (US)

(73) Assignee: DAIMLER TRUCK NORTH AMERICA, LLC, Portland, OR (US)

( * ) Notice: Subject to any disclaimer, the term of this patent is extended or adjusted under 35 U.S.C. 154(b) by 227 days.

(21) Appl. No.: 17/987,501

(22) Filed: Nov. 15, 2022

(65) Prior Publication Data

US 2023/0167837 A1 Jun. 1, 2023

Related U.S. Application Data

(60) Provisional application No. 63/284,476, filed on Nov. 30, 2021.

(51) Int. Cl.
*F15D 1/00* (2006.01)
*F01N 11/00* (2006.01)
*F01N 13/08* (2010.01)
*G01N 1/22* (2006.01)

(52) U.S. Cl.
CPC .......... *F15D 1/0005* (2013.01); *F01N 11/002* (2013.01); *F01N 13/08* (2013.01); *G01N 1/2247* (2013.01)

(58) Field of Classification Search
CPC ...... F01N 11/002; F01N 13/008; F01N 13/08; F01N 2240/20; F01N 3/2892; F15D 1/0005
See application file for complete search history.

(56) References Cited

U.S. PATENT DOCUMENTS 11,519,316 B2 * 12/2022 Buening ............. F01N 13/1888
2022/0127992 A1 * 4/2022 Buening ............. F01N 13/1888
2022/0389854 A1 * 12/2022 Vaishampayan ...... F01N 13/082

* cited by examiner

*Primary Examiner* — Anthony Ayala Delgado
(74) *Attorney, Agent, or Firm* — Troutman Pepper Hamilton Sanders LLP

(57) ABSTRACT

Baffle plate devices, exhaust gas aftertreatment apparatuses, and methods for controlling airflow in exhaust gas aftertreatment apparatuses are disclosed. In some examples, a baffle plate device is mounted within an outlet conduit via which the exhaust gas treated by an exhaust gas aftertreatment apparatus exits to the environment. The baffle plate device impacts the flow path of the treated exhaust gas within the outlet conduit to deflect a portion of the treated exhaust gas toward tips of sensors, which extend into the flow path toward the baffle plate device, in order to mitigate the impact of the recirculation region, improve the flow characteristics (e.g., rate, direction, and/or field) of the treated exhaust gas at the tips, and thereby improve the accuracy of the sensors. By improving sensor accuracy, the disclosed technology advantageously reduces false positives and improves engine performance and emissions compliance.

16 Claims, 4 Drawing Sheets

BAFFLE PLATE DEVICES FOR SENSOR FLOW IMPROVEMENT IN EXHAUST GAS AFTERTREATMENT SYSTEMS

This application claims priority to U.S. Provisional Patent Application No. 63/284,476, filed Nov. 30, 2021, which is incorporated by reference herein in its entirety.

FIELD

This technology generally relates to exhaust gas aftertreatment systems and, more particularly, to baffle plate devices for sensor flow improvement in exhaust gas aftertreatment systems.

BACKGROUND

Current diesel engines employ an aftertreatment system that uses selective catalytic reduction (SCR), a diesel oxidation catalyst (DOC), a diesel particulate filter (DPF), and/or diesel exhaust fluid (DEF) to cleanse exhaust gas before it is released into the atmosphere. For example, aftertreatment systems reduce nitrogen oxides (NOx) from the combustion exhaust gases using hydrogen at catalytic converters. Accordingly, the purpose of the aftertreatment system is to reduce the emission of harmful pollutants into the environment, which is generally required to comply with statutory emission regulations.

To confirm compliance with such regulations, and optimal engine performance, aftertreatment system sensors are generally disposed within the flow path of the treated exhaust gas. The sensors can measure the nitrogen oxide or particulate levels of the treated exhaust gas, for example. The sensors can be coupled to on-board diagnostic (OBD) systems and can send diagnostic fault codes or signals to the OBD systems when a threshold level is exceeded.

However, current aftertreatment system sensors are prone to false positives, which raises compliance concerns among other downstream issues. The inaccuracy of the sensors in some implementations is due to insufficient flow characteristics (e.g., rate, direction, and/or field) of the treated exhaust gas at the sensor tips. This problem is often exacerbated by the compact configuration of aftertreatment systems, due to size and/or weight incentives, for example, which results in bends, curves, and/or recirculation regions in the flow path of the treated exhaust gas that impact the flow characteristics of the treated exhaust gas to the detriment of the accuracy of the sensors.

SUMMARY

In one example, a baffle plate device is disclosed that includes first and second side extensions including first and second tabs extending therefrom, respectively. The first and second tabs are configured to mount to respective interior and opposing portions of an outlet conduit that provides a flow path to the atmosphere for exhaust gas treated by an exhaust gas aftertreatment apparatus. The first and second side extensions are configured to deflect a first portion of the treated exhaust gas in the flow path towards first and second tips of first and second sensors that extend through first and second sensor apertures in a wall of the outlet conduit. In this example, the baffle plate device further includes a baffle aperture disposed between the first and second side extensions and configured to permit passage of a second portion of the treated exhaust gas in the flow path so as to direct the second portion of the treated exhaust gas to impact a third tip of a third sensor that extends through a third sensor aperture in the wall of the outlet conduit.

In another example, an exhaust gas aftertreatment apparatus is disclosed that includes an outlet conduit configured to provide a flow path to the atmosphere for exhaust gas treated to reduce pollutants. A sensor mounting plate is attached to a wall of the outlet conduit and includes a plurality of sensor bosses each disposed proximate a sensor aperture through the sensor mounting plate and the wall and configured to be coupled to one of a plurality of sensors such that a tip of each of the sensors extends into the flow path. The exhaust gas aftertreatment apparatus further includes a baffle plate device including first and second side extensions mounted to respective interior and opposing portions of the outlet conduit, spaced from first and second ones of the sensors, respectively, and configured to deflect a portion of the treated exhaust gas in the flow path towards the trips of the first and second sensors, respectively. The baffle plate device also includes a baffle aperture disposed between the first and second side extensions and configured to permit passage of another portion of the treated exhaust gas in the flow path. The tip of a third one of the sensors is configured to extend into the outlet conduit beyond the baffle aperture.

In yet another example, a method for controlling airflow in an exhaust gas aftertreatment apparatus is disclosed that includes providing a baffle plate device comprising first and second side extensions. The baffle plate device is then positioned within an outlet conduit of the exhaust gas aftertreatment apparatus such that the first and second side extensions are disposed opposite and spaced apart from at least a portion of first and second ones of a plurality of sensors that extend through a plurality of sensor apertures in one or more of a sensor mounting plat or a wall of the outlet conduit. The baffle plate device is further positioned within the outlet conduit such that the first and second side extensions are angled to deflect a first portion of treated exhaust gas in a flow path within the outlet conduit towards at least a portion of the first and second ones of the sensors. The first and second side extensions of the positioned baffle plate device are then attached to respective interior portions of the wall of the outlet conduit.

With this technology, the flow characteristics across sensors tips in an exhaust gas aftertreatment are improved using a baffle plate device that deflects treated exhaust gas traveling via a flow path through an exhaust gas aftertreatment system outlet conduit. By improving the flow characteristics, the sensors can provide more accurate measurements, thereby reducing false positives and negatives, reducing diagnostic fault codes or signals, and improving compliance with emissions requirements as well as engine performance.

DETAILED DESCRIPTION

The exhaust gas aftertreatment apparatus 100 described and illustrated by way of the examples herein includes a baffle plate device 102 mounted within an outlet conduit 104 via which the exhaust gas treated by the exhaust gas aftertreatment apparatus 100 exits to the outside air or environment. The baffle plate device 102 impacts the flow path of the treated exhaust gas within the outlet conduit 104 to deflect a portion of the treated exhaust gas toward tips 302A-B of sensors 300A-B, which extend into the flow path toward the baffle plate device 102, in order to mitigate the impact of the recirculation region, improve the flow characteristics (e.g., rate, direction, and/or field) of the treated exhaust gas at the tips 302A-B, and thereby improve the accuracy of the sensors 300A-B. By improving sensor accuracy, the disclosed technology advantageously reduces false positives and improves engine performance and emissions compliance.

Figure 1:
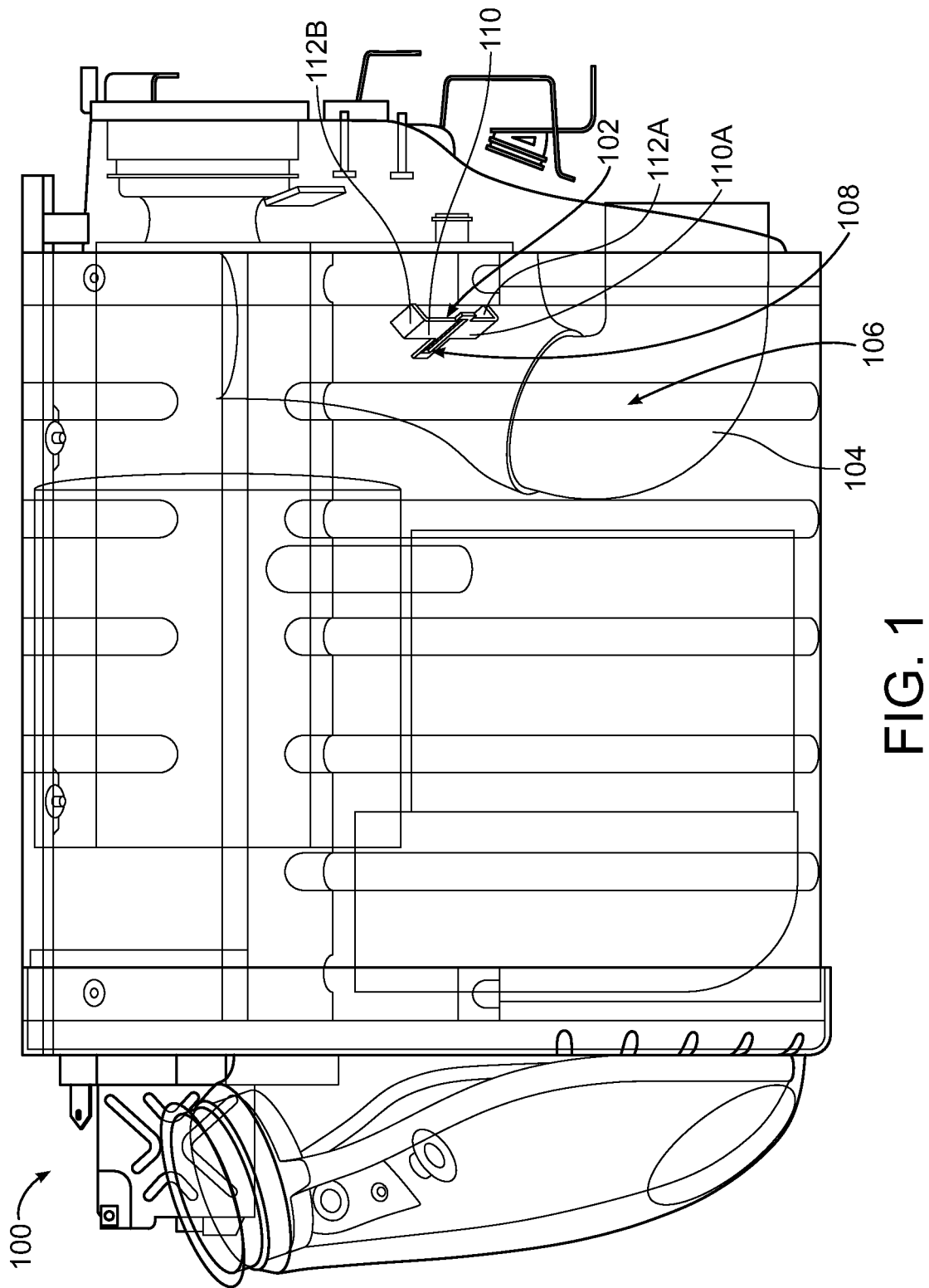
FIG. 1 is an exemplary exhaust gas aftertreatment apparatus that employs an exemplary baffle plate device.
Figure 2:
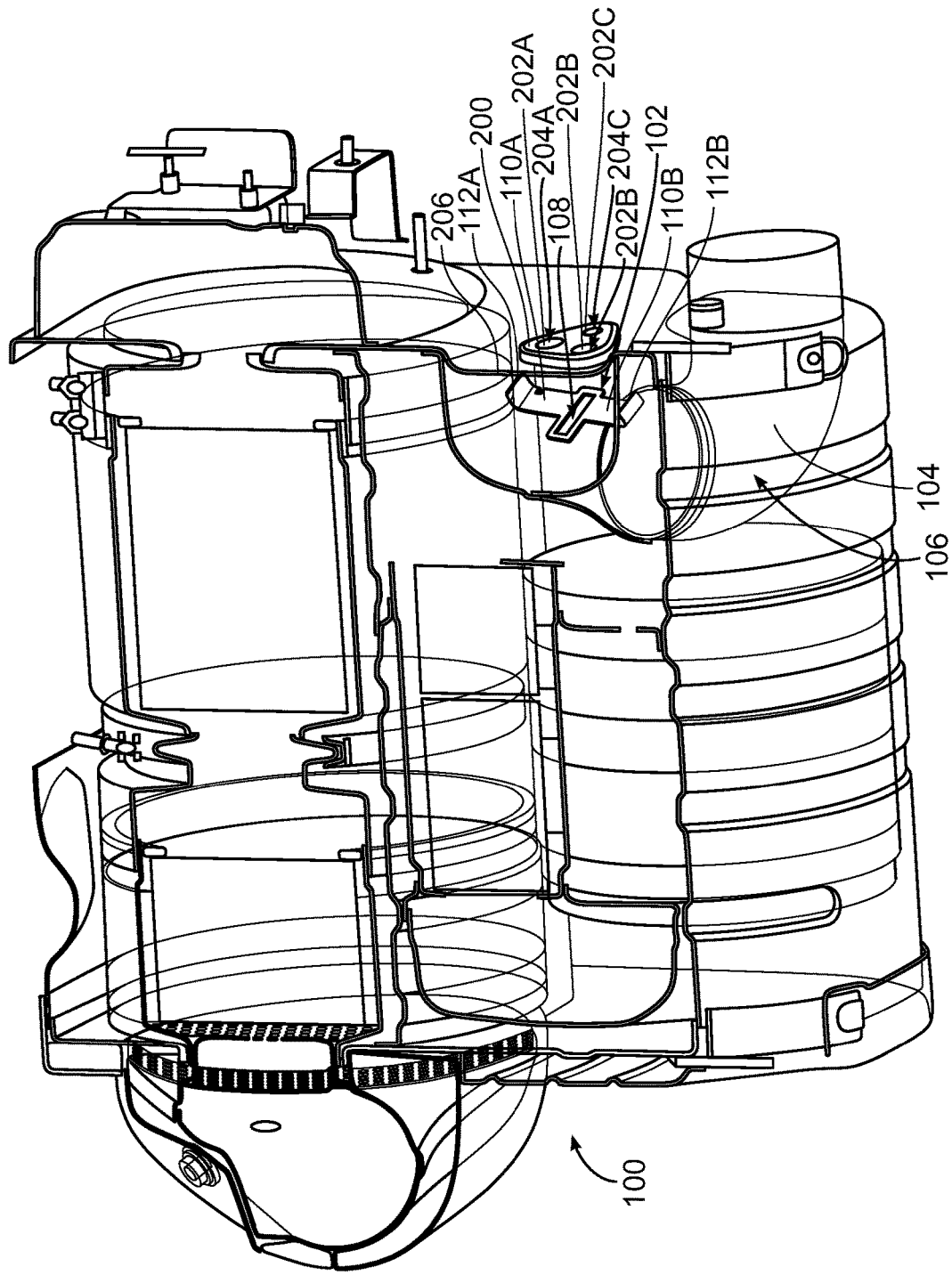
FIG. 2 is a cross-sectional view of an exemplary exhaust gas aftertreatment apparatus that employs an exemplary baffle plate device and an exemplary sensor mounting plate.
Figure 3:
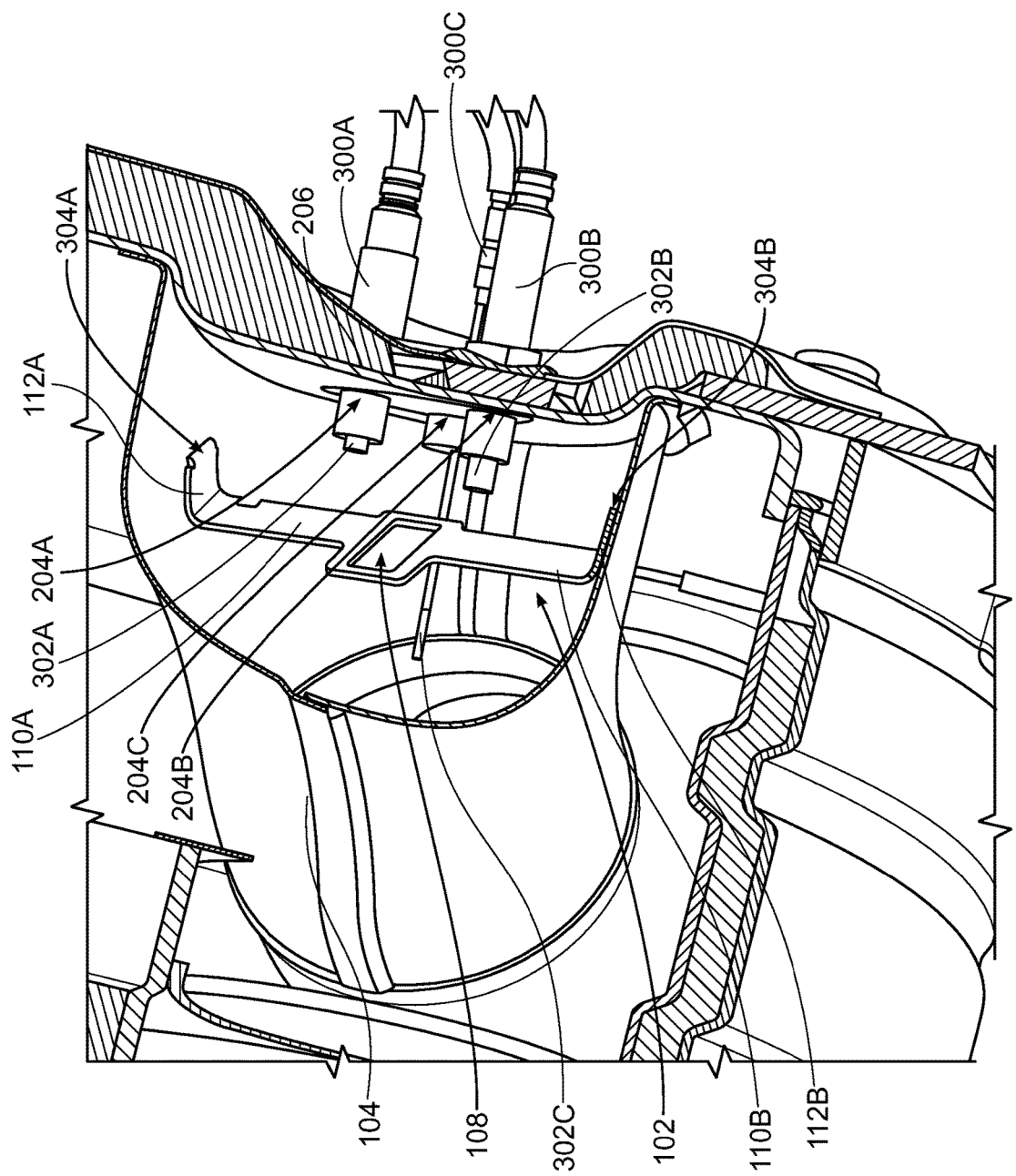
FIG. 3 is a cross-sectional view of an exemplary exhaust gas aftertreatment apparatus that employs an exemplary baffle plate device and an exemplary plurality of sensors.

Referring to FIGS. 1-3, an exemplary exhaust gas aftertreatment apparatus 100 that employs an exemplary baffle plate device 102 according to some examples of this technology is illustrated. The exhaust gas aftertreatment apparatus 100 may be employed in a diesel engine in order to treat exhaust gas to remove pollutants, for example. Subsequent to being treated, the exhaust gas follows a flow path through an outlet conduit 104, which in this example includes a bend 106 that creates a recirculating region in the flow path negatively impacting the flow rate of the treated exhaust gas across sensors 300A-C, which are described and illustrated in more detail below with reference to FIG. 3.

To improve the flow characteristics at the sensors 300A-B, and the resulting accuracy of the sensors 300A-B, the baffle plate device 102 is mounted within the outlet conduit 104 to deflect a portion of the treated exhaust gas in the flow path towards the sensors 300A-B. The baffle plate device 102 in this example includes a baffle aperture 108 disposed between side extensions 110A-B. The baffle plate device 102 is mounted in the outlet conduit 104 and is configured such that the side extensions 110A-B deflect a portion of the treated exhaust gas toward respective sensors 300A-B while the baffle aperture 108 permits the passage of another portion of the treated exhaust gas in the flow path so as to contact the sensor 300C.

In this particular example, the side extensions 110A-B include tabs 112A-B, respectively. The tabs 112A-B in this example extend substantially perpendicularly from distal ends of respective side extensions 110A-B and are configured to mount (e.g., weld) to opposing interior portions of the outlet conduit 104 to position the baffle plate device 102 within the outlet conduit 104, although other types of attachment means for the baffle plate device 102 can also be used in other examples.

Referring more specifically to FIG. 2, a cross-sectional view of the exemplary exhaust gas aftertreatment apparatus 100 that employs the exemplary baffle plate device 102 and a sensor mounting plate 200 according to some examples of this technology is illustrated. The sensor mounting plate 200 in this example includes sensor bosses 202A-C, each of which is disposed proximate a respective one of sensor apertures 204A-C through the sensor mounting plate 200 and a wall 206 of the outlet conduit 104.

The sensor bosses 202A-C are configured to couple to the sensors 300A-C, which extend through the sensor apertures 204A-C in the sensor bosses 202A-C and the wall 206 of the outlet conduit 104. The sensor bosses 202A-C can be threaded protrusions configured to thread to a portion of the sensors 300A-C, respectively, for example, although other types of attachment mechanisms for the sensors 300A-C can also be used. While three sensor bosses 202A-C are illustrated in this example, more or fewer sensor bosses can be used in other examples. Additionally, another mounting mechanism other than, or in addition to, the sensor mounting plate 200 and/or sensor bosses 202A-C can also be used.

Referring more specifically to FIG. 3, a cross-sectional view of the exemplary exhaust gas aftertreatment apparatus 100 that employs the exemplary baffle plate device 102 along with sensors 300A-C according to some examples of this technology is illustrated. The sensors 300A-C are coupled to the sensor bosses 202A-C of the sensor mounting plate 200 with a portion of each of the sensors including the tips 302A-C, respectively, extending through the sensor apertures 204A-C, respectively, and into the flow path of the treated exhaust gas within the outlet conduit 104. In some examples, the sensor 300A is a nitrogen oxide (NOx) sensor, the sensor 300B is a soot or particulate sensor, and/or the sensor 300C is a thermocouple or other temperature sensor, although other types and/or number of sensors, and/or other particular locations of the sensors 300A-C, can also be used in other examples.

The tabs 112A-B are mounted at their distal ends to interior and opposing portions of the outlet conduit 104 at respective weld points 304A-B in this example, although other weld points and/or types of mounting mechanisms can also be used. When mounted within the flow path and outlet conduit 104, the side extensions 110A-B are spaced from tips 302A-B, respectively, and configured to deflect a portion of the treated exhaust gas in the flow path towards the tips 302A-B, respectively. Accordingly, in some examples, the baffle aperture 108 is narrower than a spacing of the sensors 300A-B to ensure that an increased proportion of the treated exhaust gas in the flow path is deflected to impact the tips 302A-B.

In this particular example, the tip 302C of the sensor 300C, which is a thermocouple, extends into the outlet conduit 104 beyond the baffle aperture 108 such that another portion of the treated exhaust gas in the flow path that is permitted to pass through the baffle aperture 108 (i.e., is not deflected by one of the side extensions 110A-B) impacts the sensor 300C with flow characteristics that may be equal or close to those of the treated exhaust gas without the baffle plate device 102 disposed within the flow path. The use of the baffle aperture 108, and placement of the sensor tip 302C, facilitates an improved reading by the sensor 300C when the sensor 300C is a thermocouple or other type of temperature sensor.

Figure 4:
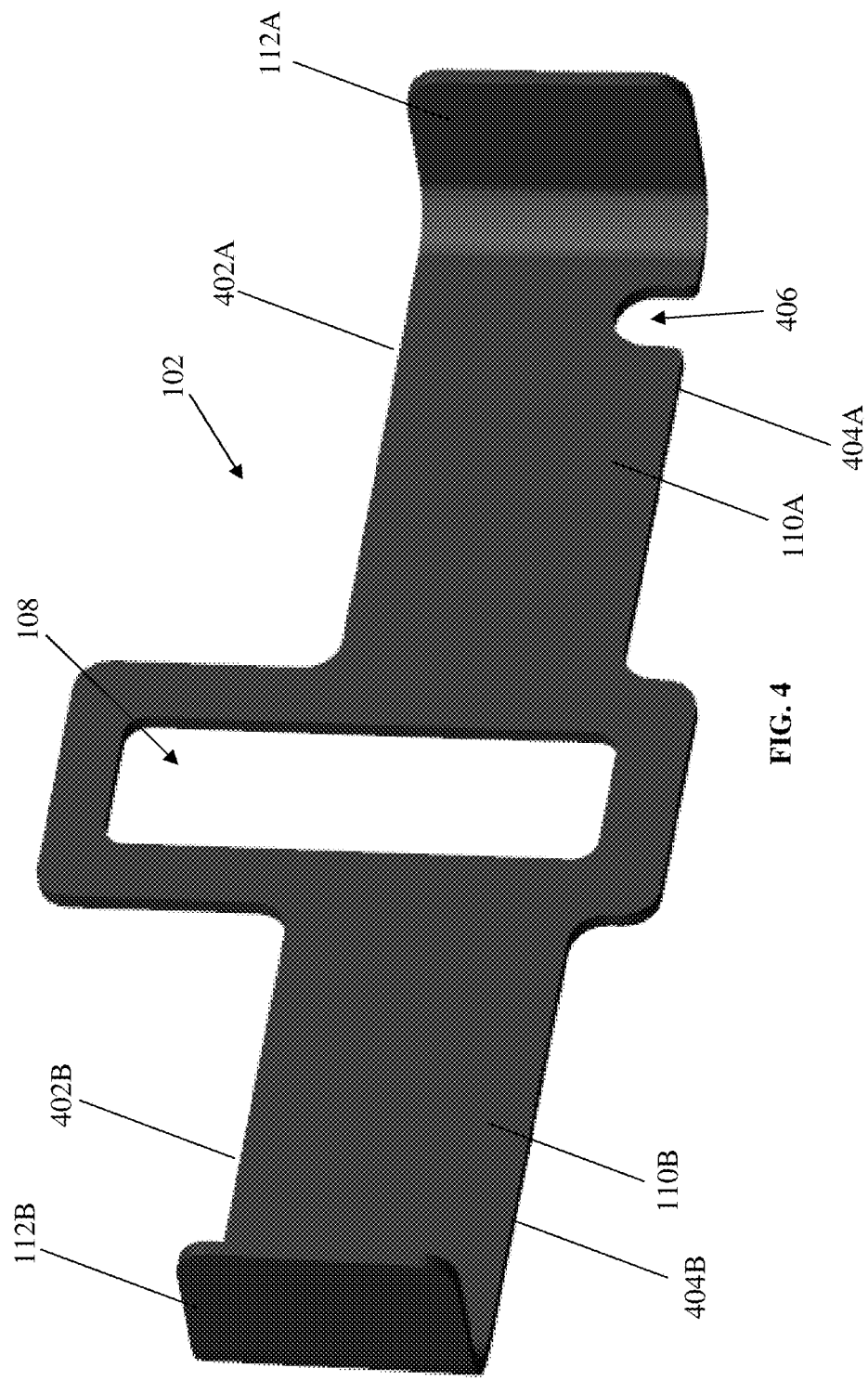
FIG. 4 is an exemplary baffle plate device.

Referring to FIG. 4, the exemplary baffle plate device 102 according to some examples of this technology is illustrated. The baffle plate device 102 in this example includes the side extensions 110A-B with the tabs 112A-B extending substantially perpendicularly at a distal end. While the tabs 112A-B in this example extend toward the wall 206 when the baffle plate device is mounted to the interior of the outlet conduit 104, the tabs 112A-B could extend substantially perpendicularly in the opposite direction, and/or at different angle(s), in other examples, and other attachment locations and/or mechanisms for the baffle plate device 102 can also be used.

In this particular example, the baffle aperture 108 extends above both side extension tops 402A-B so as to maximize the treated exhaust gas flow permitted to pass through the baffle aperture 108. However, the baffle aperture 108 can extend above only one or neither of the side extensions tops 402A-B in other examples, and different shapes and/or configurations for the baffle aperture 108 and/or the side extensions 110A-B can also be used. Additionally, the baffle aperture 108 does not extend below the side extension bottoms 404A-B in this particular example, but could extend below one or both of the side extension bottoms 404A-B in other examples. In particular the baffle aperture 108 can extend below the side extension bottoms 404A-B as far as permitted by the sensor 300C in some examples.

Optionally, the baffle plate device 102 can include a notch 406 or another indication of a direction that the baffle plate device 102 should be disposed to facilitate appropriate mounting of the baffle plate device 102 within the outlet conduit 104. Additionally, while the baffle plate device 102 is illustrated in FIGS. 1-4 as a monolithic structure, one or more portions of the baffle plate device 102 can be coupled together via welding, fastener(s), or any other attachment mechanism in other examples.

In an exemplary installation method for facilitating improved sensor operation in the exhaust gas aftertreatment apparatus 100, the baffle plate device 102, with the baffle aperture 108 disposed between the side extensions 110A-B that have the tabs 112A-B disposed at respective distal ends, is provided. A portion of each of the tabs 112A-B is then welded within an outlet conduit 104 at weld points 304A-B of the outlet conduit 104. Upon welding, the baffle plate device 102 is angled and positioned such that the flow rate of treated exhaust gas in a flow path within the outlet conduit 104 is increased at tips 302A-B of the sensors 300A-B, respectively.

In particular, the baffle plate device 102 is positioned such that the side extensions 110A-B are disposed opposite, and spaced apart from, the tips 302A-B of the sensors 300A-B, respectively. Additionally, the baffle plate device 102 is positioned such that the baffle aperture 108 is substantially aligned with the tip 302C of the sensor 300C so as to permit at least a portion of the treated exhaust gas in the flow path within the outlet conduit 104 to pass through the baffle aperture 108 to impact the tip 302C of the sensor 300C without being obstructed by the baffle plate device 102.

In some examples, the baffle plate device 102 is angled such that a portion of the treated exhaust gas in the flow path within the outlet conduit 104 is deflected toward the tips 302A-B of the sensors 300A-B by the side extensions 110A-B. The deflection advantageously eliminates the recirculation region proximate the bend 106 and improves the flow characteristics of the treated exhaust gas impacting the tips 302A-B of the sensors 300A-B to facilitate improved measurements and output by the sensors 300A-B along with improved analysis of treated exhaust gas by the exhaust gas aftertreatment apparatus 100.

As described and illustrated by way of the examples herein, this technology improves the flow characteristics across at least tips 302A-B of sensors 300A-B, respectively, by deflecting treated exhaust gas traveling via a flow path through an outlet conduit 104 of the exhaust gas aftertreatment apparatus 100, while also improving without negatively impacting the measurement at the tip 302C of sensor 300C (e.g., a thermocouple). By improving the flow characteristics, sensors 300A-B can provide more accurate measurements, thereby reducing false positives and negatives, reducing diagnostic fault codes or signals, and improving compliance with emissions requirements.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A baffle plate device, comprising:
   first and second side extensions comprising first and second tabs extending therefrom, respectively, wherein:
   the first and second tabs are configured to mount to respective interior and opposing portions of an outlet conduit that provides a flow path to the atmosphere for exhaust gas treated by an exhaust gas aftertreatment apparatus; and
   the first and second side extensions are configured to deflect a first portion of the treated exhaust gas in the flow path towards first and second tips of first and second sensors that extend through first and second sensor apertures in a wall of the outlet conduit; and
   a baffle aperture disposed between the first and second side extensions and configured to permit passage of a second portion of the treated exhaust gas in the flow path so as to direct the second portion of the treated exhaust gas to impact a third tip of a third sensor that extends through a third sensor aperture in the wall of the outlet conduit.

2. The baffle plate device of claim 1, wherein the baffle aperture extends at least one of above or below a top or bottom, respectively, of one or more of the first or second side extensions.

3. The baffle plate device of claim 1, wherein the baffle aperture is narrower than a spacing between the first and second sensors.

4. The baffle plate device of claim 1, further comprising a notch or other indicator of a direction the baffle plate device is to be mounted within the outlet conduit.

5. The baffle plate device of claim 1, wherein one or more of the first, second, or third sensor apertures further extends through a sensor mounting plate disposed proximate the wall of the outlet conduit.

6. The baffle plate device of claim 1, wherein the first sensor comprises a particulate matter sensor or the second sensor comprises a nitrogen oxide sensor.

7. The baffle plate device of claim 1, wherein the third sensor comprises a thermocouple.

8. An exhaust gas aftertreatment apparatus, comprising:
   an outlet conduit configured to provide a flow path to the atmosphere for exhaust gas treated to reduce pollutants;
   a sensor mounting plate attached to a wall of the outlet conduit and comprising a plurality of sensor bosses each disposed proximate a sensor aperture through the sensor mounting plate and the wall and configured to be coupled to one of a plurality of sensors such that a tip of each of the sensors extends into the flow path; and
   a baffle plate device comprising:
   first and second side extensions mounted to respective interior and opposing portions of the outlet conduit, spaced from first and second ones of the sensors, respectively, and configured to deflect a portion of the treated exhaust gas in the flow path towards the tips of the first and second ones of the sensors, respectively; and
   a baffle aperture disposed between the first and second side extensions and configured to permit passage of another portion of the treated exhaust gas in the flow path, wherein the tip of a third one of the sensors is configured to extend into the outlet conduit beyond the baffle aperture.

9. The exhaust gas aftertreatment apparatus of claim 8, wherein the first one of the sensors comprises a particulate matter sensor or the second one of the sensors comprises a nitrogen oxide sensor.

10. The exhaust gas aftertreatment apparatus of claim 8, wherein the third one of the sensors comprises a thermocouple.

11. The exhaust gas aftertreatment apparatus of claim 8, wherein the first and second side extensions comprise first and second tabs extending substantially perpendicularly therefrom, respectively, and configured to weld to the respective interior and opposing portions of the outlet conduit at a distal end.

12. The exhaust gas aftertreatment apparatus of claim 8, wherein the baffle aperture extends at least one of above or below a top or bottom, respectively, of one or more of the first or second side extensions.

13. The exhaust gas aftertreatment apparatus of claim 8, wherein the baffle aperture is narrower than a spacing between the first and second ones of the sensors.

14. A method for controlling airflow in an exhaust gas aftertreatment apparatus, the method comprising:
   providing a baffle plate device comprising first and second side extensions;
   positioning the baffle plate device within an outlet conduit of the exhaust gas aftertreatment apparatus such that the first and second side extensions are:
      disposed opposite and spaced apart from at least a portion of first and second ones of a plurality of sensors that extend through a plurality of sensor apertures in one or more of a sensor mounting plate or a wall of the outlet conduit; and
      angled to deflect a first portion of treated exhaust gas in a flow path within the outlet conduit towards at least a portion of the first and second ones of the sensors; and
   attaching the first and second side extensions of the positioned baffle plate device to respective interior portions of the wall of the outlet conduit.

15. The method of claim 14, wherein the baffle plate device further comprises a baffle aperture disposed between the first and second side extensions and the method further comprises positioning the baffle plate device such that the baffle aperture permits passage of a second portion of the treated exhaust gas to impact another portion of a third one of the sensors, wherein the third one of the sensors comprises a tip that extends into the outlet conduit beyond the baffle aperture.

16. The method of claim 14, wherein the first and second side extensions comprise first and second tabs disposed at respective distal ends of the first and second side extensions and the method further comprises welding the first and second tabs to the respective interior portions of the wall of the outlet conduit in order to attach the first and second side extensions of the positioned baffle plate device.

* * * * *